United States Patent [19]

Jones

[11] 4,036,350

[45] July 19, 1977

[54] METHOD AND APPARATUS FOR HANDLING BRICK FOR INSPECTION AND FEEDING

[76] Inventor: Robert E. Jones, 15 S. Oak Forest Drive, Asheville, N.C. 28803

[21] Appl. No.: 431,637

[22] Filed: Jan. 8, 1974

[51] Int. Cl.² .............................................. B65G 57/00
[52] U.S. Cl. .................................... 198/420; 198/459; 214/6 A
[58] Field of Search .................. 198/31 R, 31 AC, 32, 198/34, 35, 76, 420–422, 429, 447, 443, 445, 459, 461, 462, 424; 214/1 Q, 1 QD, 7, 6 R, 6 A, 6 F, 6 M, 6 P, 6 DK, 152, 8.5 R, 8.5 C, 8.5 SS

[56] References Cited

U.S. PATENT DOCUMENTS

| | | | |
|---|---|---|---|
| 3,127,029 | 3/1964 | Luginbuhl | 214/7 |
| 3,270,897 | 9/1966 | Lingl | 214/6 A |
| 3,348,655 | 10/1967 | Pierce et al. | 198/34 |
| 3,412,843 | 11/1968 | Maulini | 198/35 |
| 3,499,560 | 3/1970 | Le Gros | 214/6 P |
| 3,529,711 | 9/1970 | Moeller | 198/34 |
| 3,656,634 | 4/1972 | Pearne et al. | 214/8.5 C |
| 3,777,873 | 12/1973 | Stuart | 214/6 A |
| 3,811,549 | 5/1974 | Preisig | 198/34 |

Primary Examiner—Evon C. Blunk
Assistant Examiner—Joseph E. Valenza
Attorney, Agent, or Firm—William E. Mouzavires

[57] ABSTRACT

A conveying system for separating bricks for inspection purposes by successive conveyors which have dissimilar speeds. A plurality of these conveying systems feed to a single conveyor on which the bricks from each system are stacked in layers where each of the layers is from a different system.

2 Claims, 7 Drawing Figures

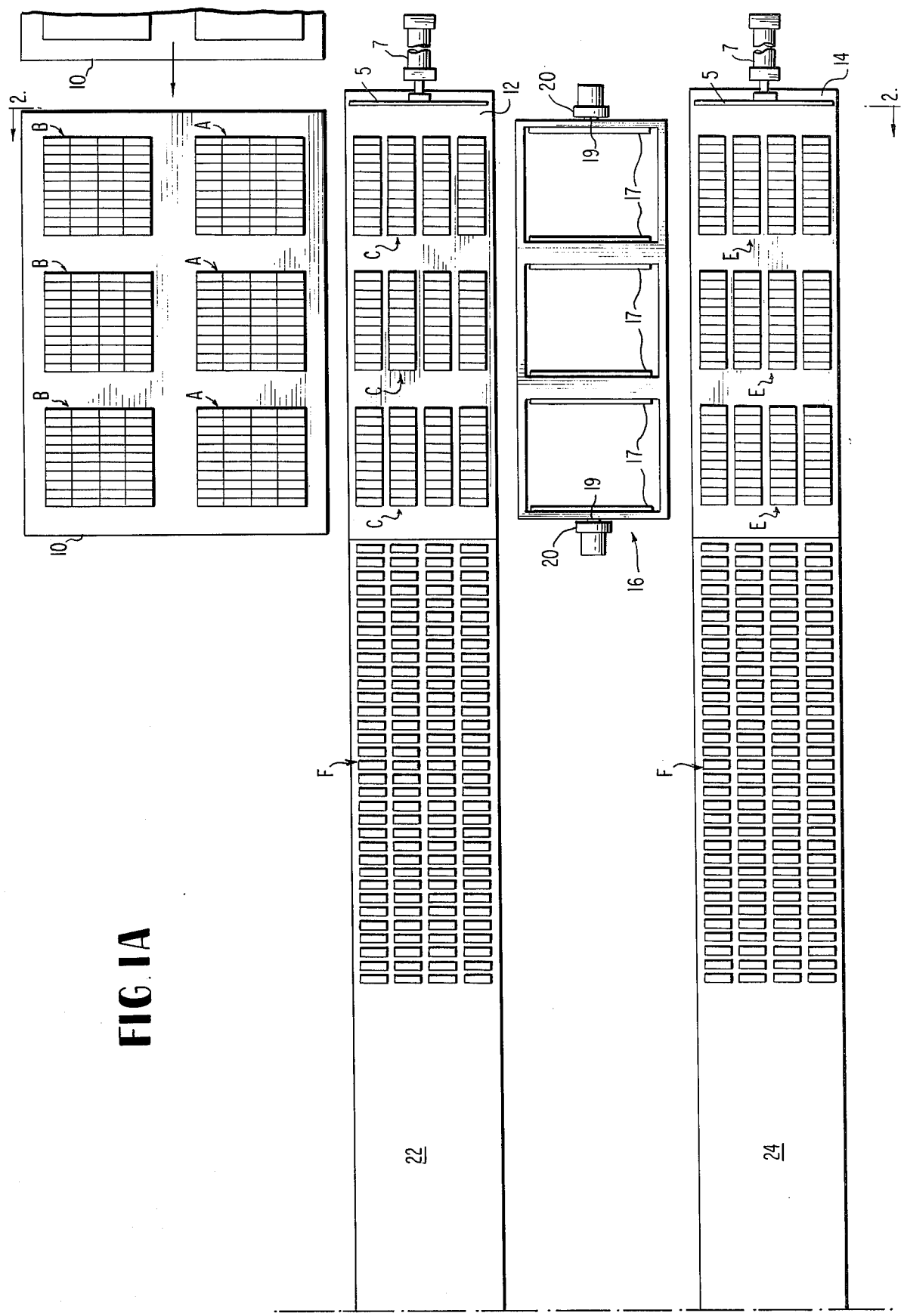

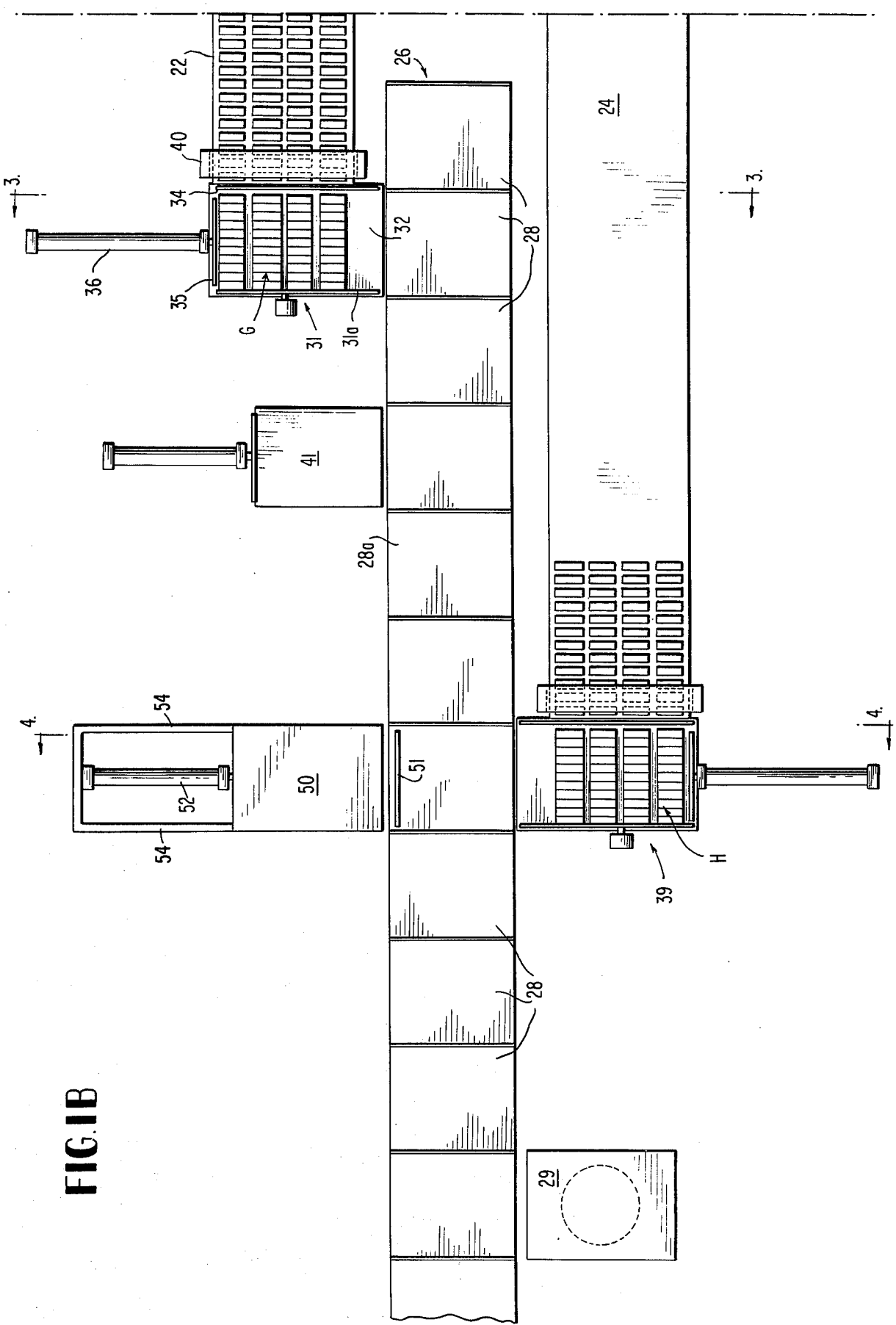

METHOD AND APPARATUS FOR HANDLING BRICK FOR INSPECTION AND FEEDING

OBJECTS OF INVENTION

The present invention relates to method and apparatus for handling articles such as bricks for inspection, grading, sorting, and for feeding multiple layers of bricks onto the trays of a conveyor such as, for example disclosed in my U.S. Pat. No. 3,738,514 or my co-pending U.S. application Ser. No. 311,070 filed Dec. 1, 1972 which conveyor then serves to transport the multi-layers to an elevator for stacking the bricks into a predetermined brick pack of the type disclosed in my aforementioned co-pending U.S. application Ser. No. 311,070. More specifically, the present invention relates to method and apparatus for inspecting, grading and sorting bricks after they have been produced in a kiln and emerge from the latter in multi-layered stacks on a kiln car and prior to the time the bricks are stacked to form an ultimate brick pack of predetermined size. The present invention also relates to method and apparatus for feeding the bricks after such inspection, grading and sorting into the trays of a conveyor which transports the bricks to a stacking elevator.

An object of the present invention is to provide method and apparatus for separating bricks from a source wherein the bricks are stacked in multi-layers, to spaced and spread out positions on a horizontal surface for inspection and removal of defective bricks. Included herein is the provision of such method and apparatus which also regroups the bricks after they have been spaced and spread out for inspection, for feeding in a plurality of layers into the trays of a conveyor which then transports the multiple layers to a stacking station for further stacking precedent to insertion into a strapping mechanism which applies steel strapping to the bricks to form an ultimate brick pack used in transportation and storage of bricks. Further included herein is the provision of such method and apparatus which also arranges the bricks for inspection with the faces of the bricks all facing upwardly to be exposed for inspection.

Another object of the present invention is to provide such a method and apparatus for forming voids in certain layers of bricks prior to stacking them on a stacking elevator, the voids being employed to accommodate the times of a fork lift truck during handling and shipment of the ultimate brick pack.

Another object of the present invention is to provide such method and apparatus which may be used in conjunction with existing commercial brick stacking apparatus such as, for example, disclosed in my co-pending U.S. application Ser. No. 311,070 and my U.S. Pat. No. 3,738,514, issued June 12, 1973.

SUMMARY OF INVENTION

The above and other objects of the present invention are achieved according to one particular method and apparatus embodying the invention which may be utilized in a brick manufacturing plant wherein the bricks emerge from the kilns on flat kiln cars in a plurality of multi-layered stacks where the layers, for example, include eleven rows of bricks with each row including four bricks. In one specific embodiment, an overhead brick gripping mechanism serves to simultaneously grip the uppermost two layers from each of three stacks of bricks on the kiln cars and to move and deposit them on a first horizontal surface or flat platform in three distinct groups with each group including two brick layers with each layer including eleven rows of bricks with each row including four bricks.

A second brick gripping head then is employed to grip the uppermost layers in each of the two layers on the first platform and to move them over and into a second platform spaced laterally from the first platform. Thus, each of the platforms has thereon three distinct layers of bricks with each layer including eleven rows with each row including four bricks.

Should the bricks when stacked on the kiln car be arranged with the faces of adjacent layers contacting each other, it is necessary that the bricks be arranged on the platforms with their faces exposed and facing upwardly so as to permit visual inspection and removal of any bricks bearing defective faces. In the event the bricks are so arranged with their faces in the stacks on the kiln cars facing upwardly, the second brick gripping head, when moving the upper layer of bricks from the first platform to the second platform, undergoes a rotation of 180° so that when the bricks are deposited in the three groups on the second platform, their faces will be exposed to permit visual inspection.

When the bricks are arranged in the stacks on the kiln cars, adjacent bricks in each of the layers engage each other, that is, some engage in bottom-to-bottom relationship, while others engage in end-to-end relationship. It is desirable in accordance with the present invention to spread the bricks out in a horizontal plane with spaces between each of the adjacent bricks to permit enhanced inspection of the bricks and to facilitate access to any defective bricks for removal. In order to space the ends of the bricks from each other, the first gripping head for transferring the bricks from the kiln car stacks to the first platform is employed. This first gripping head when depositing the bricks from the kiln car onto the first platform, spaces the ends of the bricks in each row from each other.

In order to further space the bricks so that there are spaces between each of the adjacent rows of bricks, a pair of belt conveyors are placed in alignment with the ends of the first and second platforms and the layers of bricks on the platforms are conveyed by a pusher member onto the belt conveyors. Inasmuch as the belt conveyors are designed to travel faster than the speed at which the bricks are discharged from the platforms onto the belt conveyors, the adjacent rows of bricks are spaced from each other so that inspectors positioned adjacent the belt conveyors may obtain enhanced visual inspection of the bricks and have access between the bricks to remove any defective bricks.

After inspection on the belt conveyor, the bricks are regrouped into a predetermined number of rows and fed onto the trays of a conveyor for subsequent transportation to a stacking elevator where the bricks are further stacked. The bricks are fed into the trays so that each tray will have two layers of bricks to discharge onto the stacking elevator. In accordance with the invention, this is achieved by positioning a first charging mechanism at the outlet end of one of the belt conveyors and adjacent the inlet of the tray conveyor so as to feed the trays with a single layer of bricks, for example, each layer constituting eleven rows with each row constituting four bricks. A second charging mechanism is provided on the opposite side of the tray conveyor opposite the first charging mechanism and at a point downstream along the tray conveyor for charging each of the trays with an upper layer of bricks so as to form the two layers which are desired to be discharged onto the stacking elevator. In order to deposit the second layer of bricks at the second charging station on the first layer of bricks which previously has been fed into the trays by the first charging mechanism, a horizontal "pull plate" is moved over the lower layer of bricks in the tray, the upper layer is then fed onto the pull plate, and the pull plate is then retracted to deposit the upper layer of bricks on the lower layer of bricks.

The charging mechanisms each have the same construction with the exception that the second charging mechanism which receives bricks from one of the belt conveyors is at a higher elevation than the first charging mechanism in order to enable feeding of the bricks by the second charging mechanism onto the first layer of bricks fed onto the trays by the first charging mechanism. Each of the charging mechanisms includes a vertical cushion stop projecting upwardly from a horizontal platform with the platform being in close abutting engagement with the outlet of the associated belt conveyor to receive bricks from the belt conveyor. As the bricks move from the belt conveyor onto the horizontal platform of the charging mechanism and after the forwardmost bricks in the first row of bricks engages the cushion stop of the charging mechanism, each of the rows of bricks will then be placed in abutting engagement with each other thereby closing the spaces previously existing while on the inspection conveyor. When a predetermined number of rows of bricks has been fed into the charging mechanism, a vertical plate is lowered on the horizontal charging platform opposite the stop. At the same time the associated belt conveyor is stopped and a hold back mechanism is lowered to engage and arrest movement of the bricks positioned on the outlet end of the belt conveyor. A pusher mechanism is then employed to move across the platform of the charging mechanism to transfer the bricks therefrom onto the trays.

In order to form voids in certain layers of bricks which ultimately are used to accommodate the tines of a fork lift truck in the ultimate brick pack, bricks are removed from the first layer of bricks charged onto one of the trays by the first charging mechanism. During this operation, the tray conveyor is stopped and the bricks are removed from the lower layer in one of the trays at a station situated between the first charging mechanism and the second charging mechanism. The bricks removed from the lower layer to form the voids are placed on an auxiliary horizontal tray positioned on one side of the tray conveyor. When sufficient bricks have been accumulated on the auxiliary tray, they may be fed back into one of the trays to constitute a lower layer. Any suitable method may be employed for removing bricks in the lower layer while on the trays to form the voids. Automatic removal may be achieved by utilizing the method and apparatus disclosed in my above identified co-pending U.S. application identified above. Additionally, if desired, manual brick removal may be employed while the tray conveyor is temporarily stopped.

DRAWINGS

Other objects and advantages will become apparent from the following more detailed description taken in conjunction with the attached drawings in which:

FIG. 1A discloses a plan view of apparatus embodying the invention and which may be employed for carrying out the method of the present invention;

FIG. 1B is a view similar to FIG. 1A but showing another, left-hand portion of the apparatus not shown in FIG. 1A;

DETAILED DESCRIPTION

Figure 2:
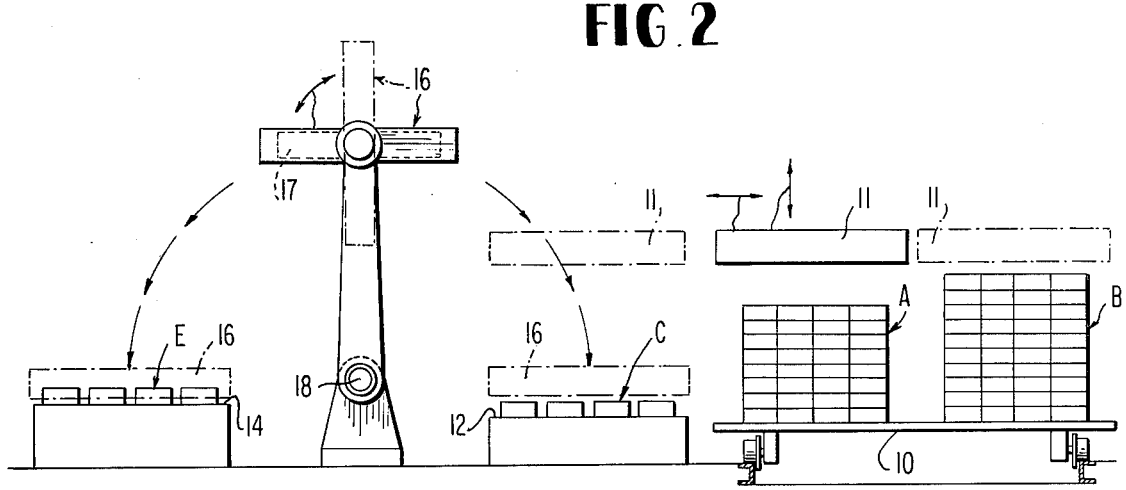
FIG. 2 is an end elevational view of certain portions of the apparatus taken along lines 2—2 of FIG. 1A.
Figure 3:
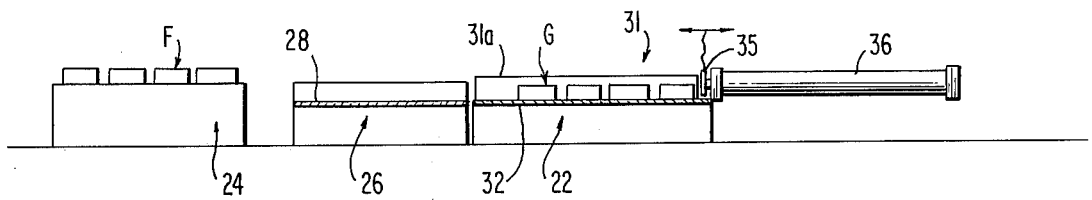
FIG. 3 is a cross-sectional view taken along lines 3—3 of FIG. 1B.

Referring now to the drawings in detail, there is shown for illustration purposes in FIGS. 1A and 1B a system including apparatus embodying the present invention which also may be used in carrying out the method aspect of the present invention. In the specific embodiment illustrated, a source of bricks is shown as including three groups of bricks generally designated A positioned on one side of a horizontal kiln car 10 and another three groups of bricks generally designated B positioned on the opposite side of the same kiln car 10. This corresponds to the position of the bricks on the kiln car after they have been dried in a kiln in a brick manufacturing plant. It will be noted that the bricks are stacked in layers each including eleven rows of bricks with each row including four bricks, this being one of the common arrangements utilized in the industry.

The present invention is employed to remove bricks from the stacks A and B on kiln car 10 to spread the bricks apart on a horizontal surface with all of the brick faces exposed upwardly to permit brick inspection and removal of defective bricks, the latter occurring on belt conveyors 22 and 24; and then to regroup the bricks into a predetermined number of rows G and H and to feed them onto the trays 28 of a horizontal conveyor 26 so as to be discharged onto a stacking elevator at the outlet 29 of the tray conveyor as, for example, disclosed in my U.S. Pat. No. 3,738,514 or my co-pending U.S. application Ser. No. 311,070. The ultimate brick pack to be formed typically may be of the type including 10 layers of brick with each layer including 11 rows with each row including four bricks with the exception, however, that the third layer from the bottom has two voids in two rows thereof to accommodate the tines of a fork lift truck. For a more detailed description of the tray conveyor system, including the mechanism at the discharge end thereof for discharging the bricks onto the stacking elevator, reference may be had to my U.S. Pat. No. 3,738,514 and my co-pending U.S. application Ser. No. 311,070 whose disclosure is hereby incorporated by reference into this application.

In carrying out the present invention, an overhead brick gripping mechanism having three gripping heads 11 is employed to grip and remove the top two layers in each of the brick stacks A on kiln car 10 and to deposit them in group C on a horizontal platform 12 situated adjacent one side of kiln car 10. The brick gripping mechanism employed by this may be of the conventional type presently available on the market, for example, reference being had to the disclosures of the United States patents to Pearne U.S. Pat. No. 3,487,959 and Johnson U.S. Pat. No. 2,961,810, which disclose similar brick gripping mechanisms. It should be noted that when the bricks are in the stacks A and B on kiln car 10, the bricks in each of the rows are in end-to-end abutting relationship while the tops and bottom sides of the bricks are also in engaging relationship. The overhead brick gripping mechanism described above not only serves to transfer the bricks from the groups A and B to the platform 12, but furthermore in doing this, it also spaces the ends of the bricks in each of the rows, such spacing being shown in FIG. 1. It should be understood that the top two layers of bricks are removed simultaneously from each of the stacks A while on the kiln car by the same brick gripping mechanism and simultaneously transported over platform 12 and then deposited on platform 12 in groups of two layers represented by C. After the rick gripping mechanism concludes transfer of the brick stacks A onto the platform 12, it then traverses further and begins to simultaneously unload and transfer to platform 12 the bricks from stacks B.

After the bricks are transferred onto to platform 12 in groups C each constituting two layers, the uppermost layer is simultaneously removed by means of a second brick gripping mechanism generally designated 16 and traversed to and deposited on a second stationary platform 14 spaced laterally from the first platform 12 and stiuated in a slightly higher plane as indicated in FIG. 2. Any suitable brick gripping mechanism 16 may be employed such as may have, for example, three pairs of brick gripping heads 17 which engage the opposite outer sides of the upper layers in each group C while maintaining the spacing between the ends of the bricks in each of the rows. Brick gripping mechanism 16 further includes a yoke including vertical legs 20 (only one shown in FIG. 2) pivotable about a horizontal axis 18 so as to enable brick gripping heads 17 to be lowered and raised for purposes of picking up the upper layers of groups C on platform 12 and depositing them on platform 14 into groups E.

In certain situations where the bricks while stacked in groups A and B on kiln cars 10, have their faces oriented upwardly, it is necessary that the upper layer of bricks on groups C when deposited on platform 14 to form group C be inverted so as to expose the brick faces upwardly. In order to achieve this, brick gripping head 17 of brick gripping mechanism 16 are mounted relative to yoke 20 for rotation about horizontal axis 19. Thus, prior to depositing the upper layer of bricks on the platform 14, brick gripping heads may be rotated 180° about axis 19 relative to yoke 20 to expose the faces of the bricks upwardly, such operation sometimes being referred to in the trade as "facing the bricks". In situations where the bricks while stacked in groups A and B on the kiln car 10 are arranged with the faces in adjacent layers contacting each other, it will, of course, not be necessary to rotate brick gripping head 17 to face the bricks in the manner mentioned above prior to depositing the bricks on platform 14.

It will be noted from FIG. 1A that when the bricks are in groups of C and E on platform 12 and 14, the ends of the bricks in each of the rows are spaced from each other to provide access and visibility. It is now necessary to space the rows of bricks from each other to provide additional access and visibility for inspection and removal of any defective bricks. To achieve the latter, the bricks are conveyed from platforms 12 and 14 onto the inlet ends of a pair of inspection conveyors which may be comprised, for example, of a pair of endless belt conveyors generally designated 22 and 24. Such transfer of the bricks from platforms 12 and 14 to associated inspection conveyors 22 and 24 may be achieved by any suitable means such as the vertical pusher members 5 situated in a vertical plane over platforms 12 and 14, respectively, to be actuated along the platforms by motors such as fluid cylinders 7. Pusher members 5 push the brick groups C and E from platforms 12 and 14 onto the inlet ends of inspection conveyors 22 and 24 which are situated at a plant corresponding to the plane of the associated platform; it being understood that platform 14 is at a higher plane than platform 12 and the same will be true as regards inspection conveyor 24 and inspection conveyor 22, the purpose of which will become apparent.

Any suitable or conventional endless belt conveyors 22 and 24 may be employed for the inspection conveyors. However, in order to achieve the additional spacing of the bricks mentioned above, belt conveyors 22 and 24 are operated at a greater speed than vertical pusher members 5 when pushing bricks C and E along platforms 12 and 14 and onto inspection conveyors 22 and 24. This difference in speeds, causes the bricks to be spaced as they arrive on inspection conveyors 22 and 24. The orientation of the bricks while on the inspection conveyors is indicated by F in FIG. 1A. After pusher members 5 deposit all of the bricks on platforms 12 and 14 onto inspection conveyors 22 and 24, their associated actuators 7 are reversed in direction to retract pusher members 5 to the initial position shown in FIG. 1A whereupon subsequent loading of bricks from stacks A or B may resume onto platforms 12 and 14.

The bricks as arranged at F on inspection conveyors 22 and 24 may now be easily inspected by an operator standing alongside inspection conveyors 22 and 24. If any defective bricks are noted, they may be easily removed and a new brick restored inasmuch as the spacing between the bricks provides the necessary access as well as visibility for inspection.

After the inspection process is completed, the bricks must then be regrouped into a predetermined number for feeding onto the trays of a conveyor generally designated 26 which eventually will convey the bricks in two layers to a discharge station 29 where two layers of bricks will be discharged from each of the trays onto a stacking elevator. The discharge of the bricks from the trays and the stacking of the same on the elevator and the transportation to the strapping station themselves form no part of the present invention, however, for a more detailed description thereof reference may be had to my U.S. patent and my pending U.S. application identified above.

Inspection conveyors 22 and 24 straddle the center line of the tray conveyor 26 as clearly shown in FIG. 1B, and inspection conveyor 22 is shorter in length then inspection conveyor 24. In this way, bricks emerging from the outlet ends of inspection conveyor 22 may be loaded into one of the trays 28 of tray conveyor 26 adjacent the inlet of tray conveyor 26. As seen in FIG. 1B, this layer of bricks designated G has, for example, eleven rows of bricks with each row including four bricks. Moreover, layer G is deposited on the surface of trays 28 so as to constitute a lower layer of bricks. The upper layer H of bricks to be deposited on the lower layer G in each of the trays 28, is formed at the outlet end of the other inspection conveyor 24 which outlet end is situated downstream on conveyor path 26 from the outlet end of inspection conveyor 22. In view of the fact that the upper layer of bricks H is to be deposited on the lower layer of bricks G, inspection conveyor 24 and the associated platform 14 are at a slightly higher elevation than inspection conveyor 22 and its associated platform 12 as mentioned above.

With the exception of the difference in elevation mentioned above, any suitable charging mechanism generally designated 31 and 39 may be employed to regroup the bricks into groups G and H and to feed them into the trays 28 of conveyor 26. With reference to charging mechanism 31 associated with inspection conveyor 22, it includes in the shown embodiment a horizontal platform 32 situated closely adjacent and in the same plane of the trays 28, at the inlet end of tray conveyor 26. Projecting upwardly from charging platform 32 is a vertical wall which may be termed a "cushion stop" 31a against which the forwardmost row of bricks engages to stop and limit further movement of the bricks across charging platform 32. It will be obvious that after the first row of bricks engages cushion stop 31, the spaces between the rows of bricks will be closed as the bricks are conveyed from inspection conveyor 22 to charging platform 32. Ultimately, all the spaces between the rows of bricks are closed. When eleven rows of bricks have been accumulated on charging platform 32, a vertical wall which may be termed a "lift guide" 34 is lowered between the charging platform 32 and the outlet of inspection conveyor 22 to contain one side of the brick group B opposite the cushion stop 32. At this point, inspection conveyor 22 is stopped and a hold back device which may include a horizontal bar 40 is lowered to engage the bricks at the extreme outlet end of inspection conveyor 22 to prevent tumbling movement of the bricks.

After the bricks are charged onto platform 32 and conveyor 28 is stopped and lift guide 34 is lowered, a pusher member 35 actuated by fluid cylinder 36 is energized to push the group of bricks G directly onto the surface of one of the tray conveyors 28 aligned with charging platform 32. After transfer of the bricks in this manner, pusher member 35 is retracted to its initial position, lift guide 34 is raised as is hold back bar 40, thus allowing inspection conveyor 22 to again be energized to continue feeding the bricks onto platform 32 for the next tray charging operation.

With the exception of the fact that its horizontal charging platform is at a higher elevation than charging platform 32 of charging mechanism 31, charging mechanism 39 situated on the opposite side of conveyor 26 downstream from charging mechanism 31, may have the same construction as charging mechanism 31. The various parts thereof need not be repeated here. It should be noted, however, that when each of the trays 28 loaded with a layer G of bricks reaches charging mechanism 39, tray conveyor 26 is stopped and charging mechanism 39 is operated to insert layer H onto layer G in the adjacent tray so that subsequently when the trays reach the discharge station 29, two layers of bricks will be deposited onto the stacking elevator.

Figure 4A:
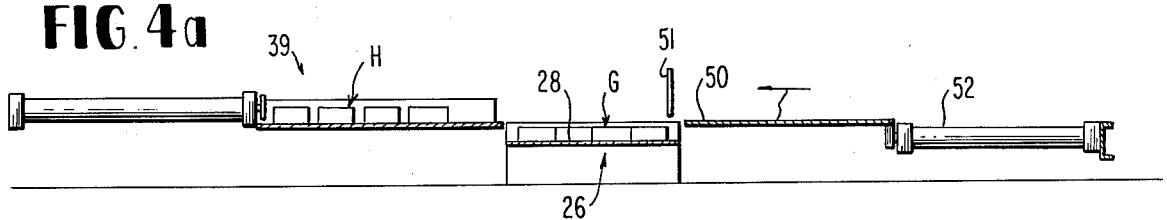
FIG. 4a is a cross-sectional view taken along lines 4—4 of FIG. 1B.

In order to effect deposit of layer H upon layer G in the trays 28, a horizontal "pull plate" 50 is employed. Pull plate 50 is normally positioned in the particular embodiment shown, on one side of conveyor 26 opposite charging mechanism 39 (see FIGS. 1A and 4a). Pull plate 50 is mounted by any suitable structure including guide rails 54 for movement in a horizontal plane from the normal retracted position on one side of conveyor 26 as shown in FIG. 1B to an extended position closely overlying the upper surface of the lower layer G of bricks in the conveyor tray 28 positioned adjacent charging mechanism, 39. Actuation of pull plate 50 between the extended and retracted positions may be achieved preferably by fluid cylinder 52.

Figure 4B:
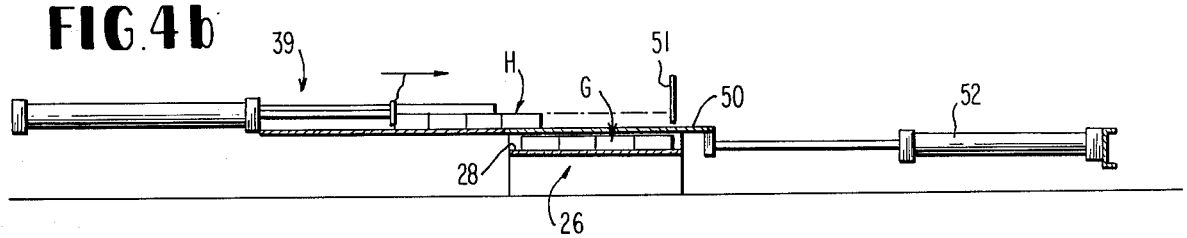
FIGS. 4b and 4c are views similar to FIG. 4A but showing the parts in successive operating positions.

In order to deposit layer H onto layer G in the trays 28, pull plate 50 is first actuated to overlie the lower layer G in the trays 28 as shown in FIG. 4b. Charging mechanism 39 is then actuated to push group of bricks H onto pull plate 50 as shown in FIG. 4b. Then, pull plate 50 is retracted to its normal position to one side of conveyor 26 thereby causing deposit of upper layer of bricks H on lower layer of bricks G as shown in FIG. 4c.

When voids are to be formed in certain rows of a certain layer of bricks for accommodating the tines of a fork lift truck, this is accomplished when the certain layer reaches the position indicated by tray 28a in FIG. 1. As noted above, automatic apparatus such as disclosed in my above identified co-pending U.S. application may be employed to remove the tine bricks or, if desired, removal may be effected manually. After the tine bricks are removed they are stored on an auxiliary tray 41 which, eventually, may be actuated to charge one of the trays 28 when a sufficient number of bricks have been accumulated thereon. After the voids have been formed in the lower layer of bricks and prior to deposit of the upper layer H, a thin sheet of wood or plastic and a sheet of paper are inserted over the layer with the voids, by an operator.

The entire operation with the exception of removal of defective bricks may be automated and controlled by an operator with a push button control panel. In addition to limit switches, timers may be employed to achieve the desired automation.

Figure 4C:
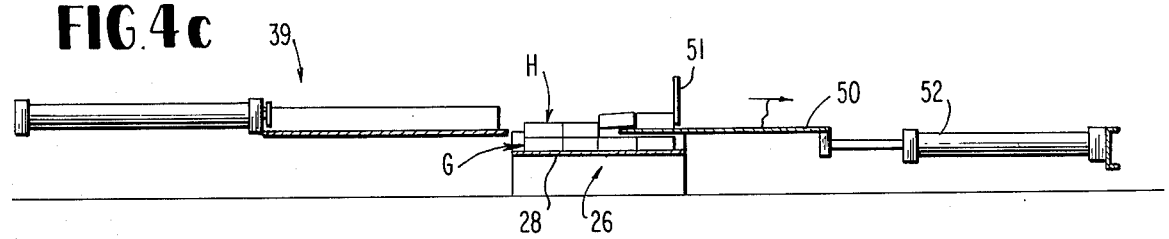

Also, it is preferred that a vertical stop plate 51 be positioned opposite charging mechanism 39 over one side of the conveyor path as shown in FIGS. 1B and 4a–4c. Plate 51 prevents movement of the upper tine course layer H of bricks off the loer layer G, when pull plate 50 is retracted as shown in FIG. 4c.

What is claimed is:

1. A method of separating bricks for inspection and subsequently regrouping and stacking them into layers comprising the steps: arranging two groups of bricks in rows on a horizontal plane with the bricks in each row being spaced in end-to-end relationship with the faces of each of the bricks exposed upwardly, spacing each of the rows of bricks from each other, regrouping each of the groups with the bricks in adjacent rows substantially engaging each other and with the ends of the bricks in each row substantially engaging each other, feeding one of the groups onto an article of conveyance, and then feeding the other group on the first group while on the article of conveyance and wherein the rows of bricks are spaced from each other by conveying the two groups on to horizontal conveyor surfaces movin faster than the speed of the bricks as they arrive on said horizontal conveyor surfaces, and wherein prior to depositing the second group of bricks on the first group of bricks a horizontal plate is inserted over the first group of bricks, the second group of bricks is placed on the horizontal plate, and the horizontal plate is retracted out from between the two groups of bricks to deposit the second group of bricks on the first group of bricks.

2. Apparatus for handling bricks comprising in combination, a first conveyor movable along a horizontal paht and having means for receiving layers of bricks, first brick feeding means situated adjacent the inlet of said first conveyor for feeding a layer of bricks on said conveyor, second brick feeding means situated downstream along the conveyor path from said brick feeding means for feeding a second layer of bricks onto the first layer of bricks, a second conveyor movable along a horizontal path for feeding bricks to said first brick feeding means, a third conveyor movable along a horizontal path for feeding bricks to said second brick feeding means, each of said brick feeding means having means associated therewith for controlling the number and arrangement of bricks fed thereto by the associated conveyor so as to permit a predetermined number of layers of bricks to be fed onto said first conveyor, and wherein there is further included third and fourth brick feeding means for feeding bricks on to said second and third conveyors in a plurality of rows and at a slower rate than the speed of said second and third conveyors so as to form spaces between the rows of bricks on said second and third conveyors, and wherein said apparatus further includes a horizontal plate and means mounting said horizontal plate for movement over said first layer of bricks while on said first conveyor to receive said second layer of bricks, and means for retracting said horizontal plate out from between said first and second layers of bricks to deposit the second layer of bricks on the first layer of bricks.

* * * * *